(12) United States Patent
Gayton et al.

(10) Patent No.: US 10,787,040 B2
(45) Date of Patent: Sep. 29, 2020

(54) TREAD PROTECTION DEVICE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Christophe Gayton, Clermont-Ferrand (FR); Stephane Oraison, Clermont-Ferrand (FR); Benjamin Quantinet, Clermont-Ferrand (FR); Matthieu Vandaele, Clermont-Ferrand (FR)

(73) Assignees: COMPAGNIE GENERALE DES ETABLISSEMENTS MICHELIN (FR); MICHELIN RECHERCHE ET TECHNIQUE S.A. (CH)

( * ) Notice: Subject to any disclaimer, the term of this patent is extended or adjusted under 35 U.S.C. 154(b) by 52 days.

(21) Appl. No.: 15/983,816

(22) Filed: May 18, 2018

(65) Prior Publication Data

US 2018/0333992 A1 Nov. 22, 2018

Related U.S. Application Data

(63) Continuation of application No. 13/808,854, filed as application No. PCT/EP2011/061369 on Jul. 6, 2011, now Pat. No. 10,000,093.

(30) Foreign Application Priority Data

Jul. 6, 2010 (FR) ..................................... 10 55455

(51) Int. Cl.
*B60C 11/12* (2006.01)
*B60C 11/03* (2006.01)
(Continued)

(52) U.S. Cl.
CPC ............ *B60C 11/12* (2013.01); *B60C 11/032* (2013.01); *B60C 11/0306* (2013.01);
(Continued)

(58) Field of Classification Search
CPC ............ B60C 11/1281; B60C 11/1392; B60C 2011/1231
See application file for complete search history.

(56) References Cited

U.S. PATENT DOCUMENTS

2011/0139325 A1* 6/2011 Janesh ................ B60C 11/0302
152/209.25

FOREIGN PATENT DOCUMENTS

DE    3531047 A1 *  3/1987  ............. B60C 11/12
JP    02179508 A  *  7/1990
(Continued)

OTHER PUBLICATIONS

Machine Translation: JP-2006151222-A; Himuro, Yasuo; (Year: 2019).*
(Continued)

*Primary Examiner* — Kendra Ly
(74) *Attorney, Agent, or Firm* — Dickinson Wright PLLC; Steven C. Hurles

(57) ABSTRACT

Tire with radial carcass reinforcement having a tread of thickness E, this tread having a tread surface and at least one cut opening onto the tread surface to form edge corners. The cut extends into the tread over a total depth H. The cut is in the form of a sipe having a width D. There is also formed, in the vicinity, i.e. at a minimum distance from the said edge corner that is at most equal to five times the width D of the cut, of at least one edge corner of this cut and on the tread surface, at least one cavity having a depth h that is small in comparison with the depth of the cut, i.e. that is at most equal to 30% of the depth H. The at least one cavity reduces (Continued)

COUPE SELON II-II the compression rigidity of the tread in the vicinity of the the at least one edge corner.

5 Claims, 4 Drawing Sheets

(51) Int. Cl.
*B60C 11/04* (2006.01)
*B60C 11/11* (2006.01)
*B60C 11/13* (2006.01)

(52) U.S. Cl.
CPC .......... *B60C 11/0323* (2013.01); *B60C 11/04* (2013.01); *B60C 11/11* (2013.01); *B60C 11/1281* (2013.01); *B60C 11/1392* (2013.01); *B60C 2011/1209* (2013.01); *B60C 2011/1231* (2013.01); *B60C 2011/1268* (2013.01)

(56) References Cited

FOREIGN PATENT DOCUMENTS

| JP | 03186407 A | * | 8/1991 | ......... B60C 11/1263 |
| JP | 2006151222 A | * | 6/2006 | |
| JP | 2009126293 A | * | 6/2009 | |

OTHER PUBLICATIONS

Machine Translation: JP-02179508-A; Watanabe, Susumu; (Year: 2019).*
Machine Translation: DE-3531047-A1; Voegler Hans Juergen DIPL ING; (Year: 2019).*
Machine Translation: JP-03186407-A; Fukazawa, Yutaka; (Year: 2020).*
Machine Translation:JP-2009126293-A; Hashimoto,Yoshimasa; (Year: 2020).*

* cited by examiner

COUPE SELON II-II

TREAD PROTECTION DEVICE

CROSS REFERENCE TO RELATED APPLICATIONS

This U.S. Continuation Patent Application claims the benefit of U.S. patent application Ser. No. 13/808,854, filed Feb. 8, 2013 entitled "TREAD PROTECTION DEVICE," PCT Patent Application No. PCT/EP2011/061369, filed Jul. 6, 2011 entitled "TREAD PROTECTION DEVICE," and French Patent Application No. 1055455, filed Jul. 6, 2010 entitled "TREAD PROTECTION DEVICE," the entire disclosures of these applications being considered part of the disclosure of this application and hereby incorporated by reference.

BACKGROUND OF THE INVENTION

1. Field of the Invention

The present invention relates to tires for heavy goods vehicles and, more particularly, to the treads of such tires.

2. Related Art

A heavy goods vehicle tire comprises a tread the radially outer surface of which forms a tread surface intended to come into contact with a roadway during running. This tread is provided, in the known way, with grooves which, upon contact with the roadway, form volumes capable of dispersing the water present on a roadway in rainy weather. These grooves have a depth corresponding substantially to the thickness of tread to be worn away and delimit raised elements which are in the form of blocks or ribs. Each raised element comprises a contact face forming part of the tread surface of the tread and lateral walls intersecting this contact face along edge corners.

In order to improve the grip performance of these treads without excessively reducing their rigidity, it is known practice to provide the raised elements with sipes which have the advantage of being able, at least partially, to close as they come into contact with the roadway. Each sipe has a depth at least equal to 50% of the depth of the grooves and has a width, corresponding to the distance between the opposing faces delimiting it, which is less than the width of the grooves in order precisely to allow them to come into contact.

In this document, a groove has a width at least equal to 2 mm and a sipe a width less than 2 mm.

Each sipe intersects a contact face of the raised element along two edge corners. These edge corners offer a particular benefit when the tread is new, i.e. when it has not yet run. This is because they make an active contribution to grip in the as-new state.

The applicant companies have found that, under particularly severe conditions of use, the material of the tread which is situated in the vicinity of certain edge corners formed by the sipes may suffer from small amounts of material being torn out, thereby reducing the performance of these edge corners and potentially causing locally more pronounced wear (known as uneven wear) which worsens during the use of the tire.

Definitions

Equatorial median plane: this is a plane perpendicular to the axis of rotation and passing through those points on the tire that are radially furthest from the said axis.

A block is a raised element formed on the tread and which is delimited by hollows or grooves and comprises lateral walls and a contact face intended to come into contact with the roadway.

A cut may be either a sipe or a groove or a combination of a sipe and a groove.

A sipe corresponds to a space between two walls of material that are distant from one another in such a way that they can come into at least partial contact under the conditions of use of a tire.

A groove corresponds to a space between two walls of material that do not come into contact with one another.

A radial direction in this document means a direction which is perpendicular to the axis of rotation of the tire (this direction corresponds to the direction of the thickness of the tread).

An axial direction means a direction parallel to the axis of rotation of the tire.

A circumferential direction means a direction perpendicular both to the axial direction and to a radial direction and which is tangential to any circle centered on the axis of rotation.

BRIEF DESCRIPTION OF THE INVENTION

The present invention seeks to avoid material being torn out in the vicinity of the sipes formed on a heavy goods vehicle tire tread and thus to avoid uneven wearing of the tread.

The total thickness of a tread must be understood here to mean the total thickness of tread that can be worn away before this tread has to be renewed either by retreading or by changing the tire.

To this end, one subject of the invention is a tread provided with grooves of a depth at most equal to the thickness E of the tread, these grooves delimiting raised elements such as ribs or blocks. Each raised element comprises a contact face forming a part of the tread surface of the tread and lateral faces intersecting the contact face to form edge corners of the raised elements. Furthermore, at least one of these raised elements comprises at least one cut opening onto the contact face of a raised element to form edge corners, this cut extending into the raised element over a total depth H at most equal to the thickness E of the tread, this cut being, between the contact face and a depth H1 at most equal to the total depth H, in the form of a sipe having a width D suitable for being able to close up at least in part under normal running conditions of the tire. This tire is characterized in that, in the vicinity of at least one edge corner of this cut on the tread surface, i.e. at a distance at most equal to five times the width D of the sipe, there is formed at least one cavity having a depth h that is small in comparison with the total depth H of the cut, i.e. that has a depth h at most equal to 30% of the total depth H, this at least one cavity reducing the compression rigidity of the tread in the vicinity of the said at least one edge corner.

The cavities thus formed in the vicinity of each edge corner of a cut by locally (i.e. as close as possible to the edge corners of the sipe) modifying, reduce the sensitivity of this cut to the tearing-out of material which is connected with possible attacks during running.

"In the vicinity of the edge corners of a cut" is to be understood to mean that at least certain of the cavities are formed on the tread surface or the contact face of the element in a region extending over all or nearly all of the length of the cut and on each side of the said cut. There is at least one cavity over a region of length L1 measured with respect to each edge corner. This width is chosen to be relatively small (at most equal to five times the width D of the sipe) in order to obtain the desired effect. Upwards of this width, the flexibility-enhancing effect of the edge corner is not enough to have an effect on the resistance to attacks during running.

For preference, a plurality of cavities is formed in the vicinity of at least one edge corner of a cut in order to spread the flexibility-enhancing effect of the tread near this edge corner.

As a preference, the total width of the region over which the cavities are formed is at most equal to thirty times the width D of the cut on the tread surface.

Thanks to the presence of these small surface cavities situated in the vicinity of each of the edge corners of a sipe, the flexibility of the raised element is enhanced in a very localized way which proves to be favorable to better resisting stresses that tend to tear material out, without disrupting the operation of the said edge corners.

This invention is applicable to cuts running transversely or alternatively circumferentially or even in an oblique direction with respect to the transverse direction.

This invention also applies to a tire having a tread of total thickness E with no grooves, this tread comprising at least one cut running circumferentially or substantially in the circumferential direction and opening onto the tread surface to form edge corners, this cut extending into the tread over a total depth H at most equal to the thickness E of the tread, this cut being, between the tread surface and a depth H1 at most equal to the total depth H, in the form of a sipe having a width D suitable for being able to close up at least in part under normal running conditions of the tire. In order to protect the edge corners by locally reducing the compression rigidity of the tread, there is formed, in the vicinity of at least certain edge corners, i.e. at a distance at most equal to five times the width D of the sipe away, and on the tread surface, at least one cavity having a depth that is small in comparison with the total depth H of the cut, i.e. that has a depth at most equal to 30% of the total depth H.

According to one preferred embodiment, the depth of the cavities is at most equal to 15% of the depth H of the cuts.

According to one preferred embodiment, these cavities have the form of small grooves of a depth preferably at most equal to 2 mm, or, more preferably still, at most equal to 1 mm.

According to a preferred embodiment, the small grooves run parallel to one another on one and the same side of an edge corner. In another alternative form, these small grooves may run parallel to the edge corners of the cut.

According to one preferred embodiment, these cavities have the shape of cylindrical holes of a depth that is small by comparison with the total depth of the cuts, in order to form on the contact face an edge corner of closed outline which may be of circular or substantially circular or rectangular or triangular shape. The cavities may have a frustoconical shape (in which case there is a relief angle of at most 10 degrees) and a depth that is small in comparison with the total depth of the cuts, i.e. at most 30% of the said depth. The depth of the cavities is preferably at most equal to 2 mm and, more preferably still, at most equal to 1 mm. In the case of holes, at least one row of holes is formed in the vicinity of each edge corner of a sipe, this at least one row running parallel to one of the said edge corners.

According to another preferred embodiment, the cavities have the form of a plurality of grooves running parallel to one another. A groove here means a cavity of elongate overall shape, i.e. one that has one very long dimension by comparison with the other dimensions of the same groove (by a factor of at least 10).

Advantageously, each cavity in the form of a groove runs parallel to the edge corners of the cut that is to be protected.

According to another embodiment of the invention, the cavities have the form of a plurality of grooves running parallel to one another and in such a way as to make an angle other than 0 degrees with the direction of the edge corners of the sipe. This angle is preferably at least equal to 45°.

According to another embodiment of the invention, the cut has the form of a sipe extending inside the tread via a channel of maximum width K intended, after partial wearing away of the tread, to form a new groove at the surface. In such a configuration, it is sensible for the region in which the cavities are formed on each side of the cut to have a width at least equal to 50% of the maximum width K. This width of the region in which the cavities are formed is measured perpendicular to the edge corner that is to be protected.

According to another embodiment of the invention, one or other of the alternative forms set out in this document can be further improved by combining the presence of at least one cavity in the vicinity of at least one edge corner of a cut with the presence of a chamfer on at least one edge corner of a cut. A chamfer means a part of a height that is small in comparison with the depth of the cut (i.e. over a depth at most equal to 10% of the depth of the cut) and making a mean angle less than 90 degrees with the tread surface. For preference, this mean angle is close or equal to 45°. The geometry of each chamfer may be planar or curved.

The presence of a chamfer generates, between the edge corner of the cut and one of the walls of the said cut, an inclined part. It may be advantageous to form on this inclined part at least one cavity in the form of at least one groove running parallel to the edge corner of the cut.

Advantageously, at least one edge corner of one cut is provided with a chamfer, this chamfer extending over the tread surface via the presence of at least one cavity having a depth at most equal to 30% of the total depth H of the cut and intended to reduce the compression rigidity of the tread in the vicinity of the said chamfer. Cavities similar to those formed on the tread surface may also be formed on each chamfer.

Advantageously, the cavities may be of varying dimensions starting from one edge corner of the cut and progressing towards the edge of the raised element situated on the same side as the said edge corner. It is notably possible to modulate the enhancement in the flexibility of the raised element according to the variation of the dimensions of the cavities.

For example, it is possible to position closest to an edge corner formed by a cut cavities having dimensions that vary with the distance with respect to the edge corners. It is thus possible to provide a variation in depth or width (in the case of grooves) or diameter (in the case of cylindrical holes) of the cavities in order to obtain a progressively flexibility-enhancing effect.

Thus, a greater enhancement in flexibility can be achieved closest to the edge corners by forming cavities that have depths that increase towards each edge corner of the cut. In another embodiment, the density of cavities can be increased as the cavities get nearer to each edge corner; the density of cavities means a volume of cavities per unit area. In one advantageous alternative form, the cavities are positioned at inter-cavity distances that are dependent on the distance of these cavities in relation to the edge corners of the cut.

According to an improvement of the invention, the tread of a tire according to the invention comprises a plurality of raised elements, at least one of these raised elements being provided with at least one cut which on the contact face of the raised element forms two edge corners. These edge corners are provided, in their vicinity, i.e. a distance at most equal to five times the width D of the cut away, with at least one main cavity in order to enhance the flexibility of the raised element in the vicinity of each edge corner of the cut. Further, this raised element comprises a plurality of additional cavities formed on each side of each main cavity, the density of these additional cavities being greater in the middle part of the cut, which corresponds more or less to the central part of the raised element. In practice, the additional cavities are formed in such a way that they are sufficiently far away from the edges of the raised element not to alter the compression rigidities of the said edges and in order to modify these same rigidities in the central part.

Further features and advantages of the invention will become apparent from the description given hereinafter with reference to the attached drawings which, by way of non-limiting examples, show some embodiments of the subject-matter of the invention.

DESCRIPTION OF THE ENABLING EMBODIMENT

To make the figures easier to understand, the same reference signs can be used for describing alternative forms of the invention when these reference signs refer to elements of the same kind either structurally or functionally.

Figure 1:
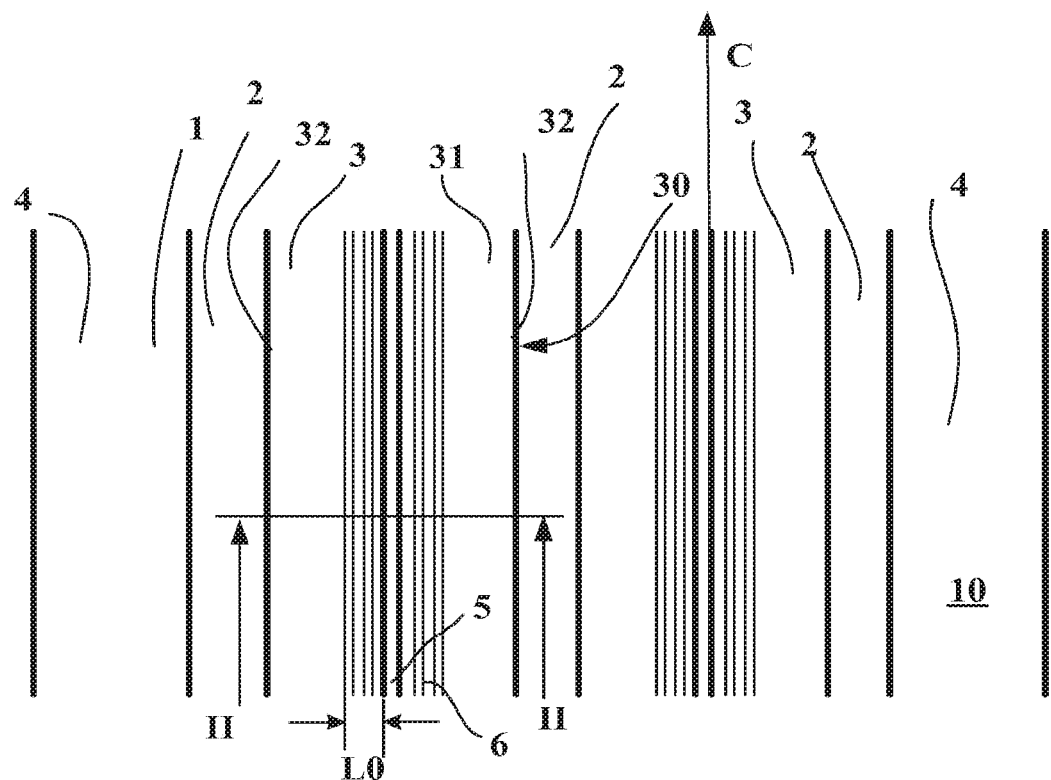
FIG. 1 shows a tread of a tire for a heavy goods vehicle according to the invention, this tread comprising a plurality of ribs running circumferentially.

FIG. 1 is a partial view of the tread surface of a tread 1 according to the invention for a tire of size 265/55R17.5 used on a heavy goods vehicle. This tread comprises three circumferential grooves 2 delimiting two intermediate ribs 3 (64 mm in width) and edge ribs 4 (40 mm in width) axially delimiting the tread. The tread 1 has a total thickness E equal to 17.5 mm and the circumferential grooves 2 have a depth P which is at most equal to this total thickness E (in this instance this depth P of the grooves is equal to 14.5 mm).

The tread 1 comprises a tread surface 10 intended to come into contact with the surface of a roadway during running. Each intermediate rib 3 comprises a face that is radially on the outside and forms a contact face 31 and forms a part of the tread surface. Each intermediate rib 3 comprises lateral faces 30 intersecting the contact face 31 along circumferentially directed edge corners 32. The axial (or transverse) width of each rib corresponds to the distance separating these edge corners.

Furthermore, the two intermediate ribs 3 are each provided with a cut 5 running circumferentially. In this FIG. 1, the circumferential direction is indicated by an arrow C.

Figure 2:
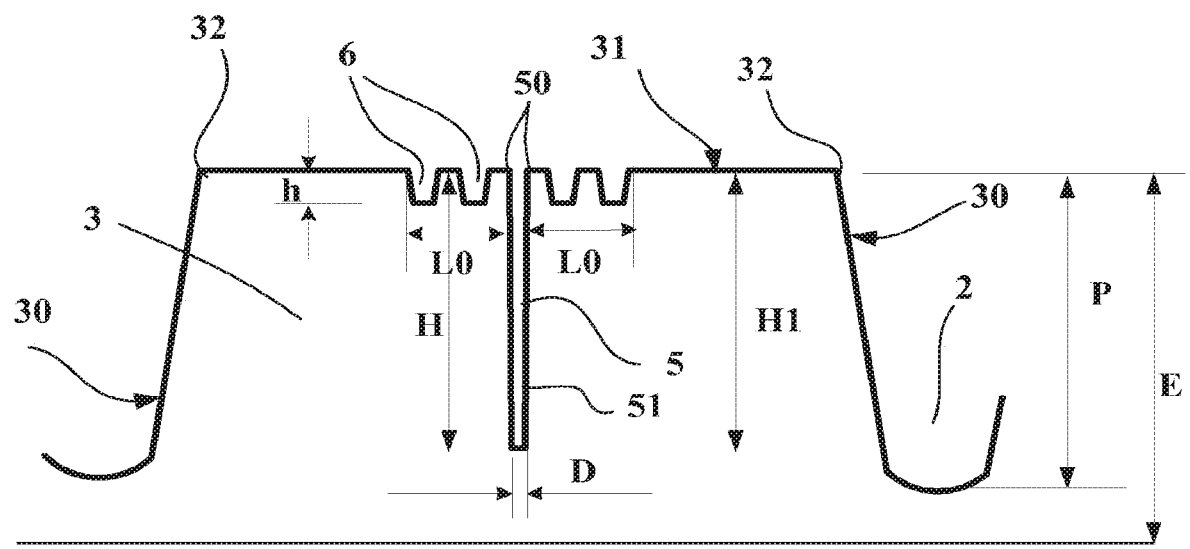
FIG. 2 is a view in section on II-II of a rib of the tread shown in FIG. 1.

As can be seen in FIG. 2, which is a section on II-II of FIG. 1, this cut 5 of total depth H, at most equal to the thickness E of the tread, has the form of a sipe of mean width 0.6 mm opening onto the contact face 31 of the rib 3. A sipe here means a cut the walls of which can come into full or partial contact with one another during running.

This cut 5 intersects the contact face 31 of the intermediate rib 3 to form two edge corners 50 which, in this instance, are parallel to the edge corners 32 axially bounding said rib.

In order to improve the resistance of each intermediate rib 3 in the vicinity of the edge corners 50 formed by the cuts 5, there is formed on the contact face 31 and in the vicinity of each of the said edge corners a plurality of cavities which, in this instance, has the form of surface grooves 6 of mean shallow depth equal to 0.6 mm and width substantially equal to 0.6 mm. In a strip of the width L0 (in this instance equal to five times the width 0.6 mm, i.e. 3 mm), starting from each edge corner 50, there are formed two surface grooves 6 which in this instance are parallel to one another and to the edge corners 50 of the sipe (they therefore run in the circumferential direction). Note that to make the figures easier to understand, these figures have not been drawn to scale: in particular the widths of the regions provided with the surface grooves 6 have been exaggerated.

This embodiment is of course not limiting per se; specifically, the cuts may be present over several ribs or even over all of them and it may be desirable to provide similar small surface grooves in the vicinity of the edge corners formed by the said cuts.

The example given in relation to FIG. 1 and FIG. 2 shows cuts that are substantially straight in the circumferential direction: the same invention also applies to the case of wavy or zigzag cuts whatever their overall direction.

Figure 3:
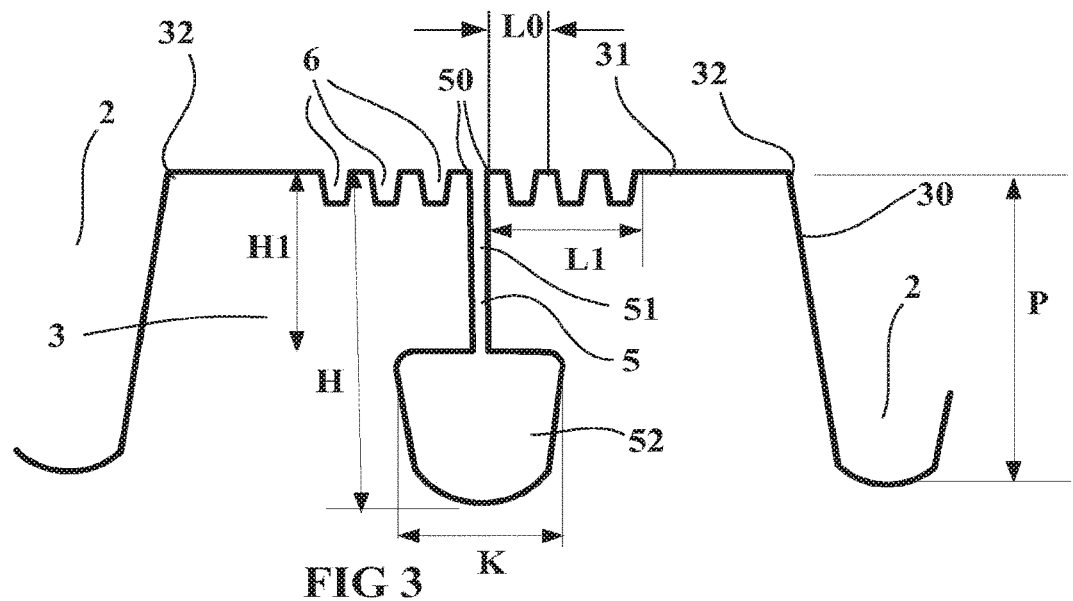
FIG. 3 is a view in section of an alternative form of tire according to the invention, the cuts comprising an internal part that forms a channel.

FIG. 3 shows a view in cross section of an alternative form of tire according to the invention, a cut comprising an internal part forming a channel 52 intended, after partial wear, to form a new groove on the tread surface. In this alternative form, the cut 5 is formed of a sipe 51 of width 0.6 mm opening onto the tread surface in the as-new condition, this sipe 51 being extended by a widening that forms a channel 52 of maximum axial width K (in this instance equal to 7.2 mm). This channel is of trapezoidal shape and has a height of 7.2 mm.

In order to improve the resistance of each rib in the vicinity of the edge corners formed by the sipes, there is formed in the vicinity of each of the said edge corners, i.e. at least in a strip of a width equal to five times the width of the sipes, a plurality of cavities which in this instance have the form of grooves of mean depth equal to 0.6 mm and substantially 0.6 mm in width. These small grooves are parallel to the edge corners 50 of the sipe. At least one of these grooves is formed in a strip of width L0; other grooves are also formed between L0 and a width L1 at least equal to one quarter of the maximum width K of the channel 52 (in this instance the width L1 is equal to the maximum width K).

Figure 4B:
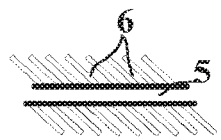
FIGS. 4A and 4B show two alternative forms of the invention using small sipes in the vicinity of the edge corners of a cut.
Figure 4A:
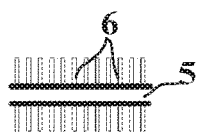

FIGS. 4A and 4B show two alternative forms of the invention using small sipes 6 in the vicinity of the edge corners of a cut 5. Small sipes 6 here means that these sipes have a short length and make an angle other than zero degrees with the direction of the edge corners of the cut. FIG. 4A shows a plurality of small sipes 6 which are perpendicular to the direction of the edge corners of the cut. FIG. 4B shows an alternative form in which the small sipes all have the same inclination whichever side of the cut 5 they are on. These same sipes could of course have different inclinations on one side by comparison with the other.

Figure 5:
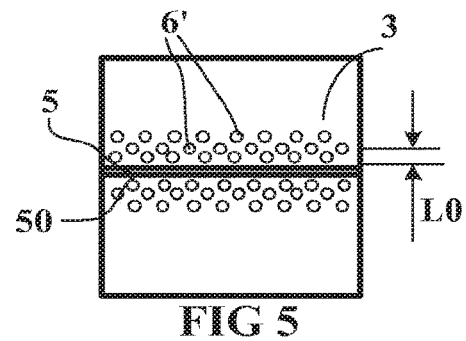
FIG. 5 shows another alternative form of the invention employing a plurality of holes in the vicinity of a cut.
Figure 6:
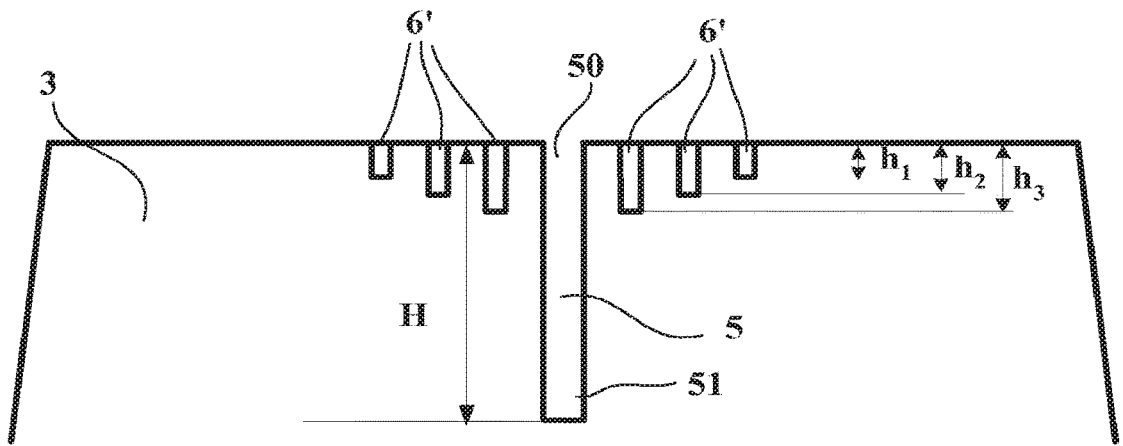
FIG. 6 shows an alternative form of the invention in which the depth of the cavities varies with the distance from the cut.

FIGS. 5 and 6 show alternative forms of the invention using a plurality of holes in the vicinity of a cut. A hole means a cavity of which the opening onto the tread surface has a closed outline.

FIG. 5 shows an alternative form of the invention using a plurality of holes 6' in the vicinity of a cut 5 formed in a block 3 of material. Each hole 6' is of circular cylindrical shape with a depth equal to 1 mm and a diameter equal to 0.6 mm. The distance between two holes is equal to 0.6 mm. These holes 6' are arranged in mutually parallel lines and in a quincunx configuration in order to achieve a fairly uniform enhancement in flexibility in the vicinity of the edge corners formed by the cut 5 on the contact face. Of course, these same holes can be arranged in different arrangements, for example without being in a quincunx configuration. In the case depicted, at least one row of holes is arranged over a strip of width L0 here equal to 1 mm, this strip being bounded on one side by an edge corner 50 of the cut 5.

FIG. 6 shows a cross section of a raised element 3 of a tread, this raised element comprising a cut 5 forming edge corners 50 on the contact face. On each side of this cut 5 there are holes 6' of which the depths h1, h2, h3 vary as a function of the distance away from said cut. In this instance, the depths of the holes increases with increasing proximity of the holes to the cut. The greatest depth h3 for these holes 6' is equal to 1.5 mm whereas the smallest depth h1 is equal to 0.5 mm. The mean distance between the holes of different depths is equal to 0.5 mm. Thus, the flexibility is enhanced more in close proximity to the edge corners of this cut and the surface rigidity changes progressively in the direction away from the said edge corners. This same progressiveness can be applied to the case of the cavities produced in the form of grooves.

Figure 7:
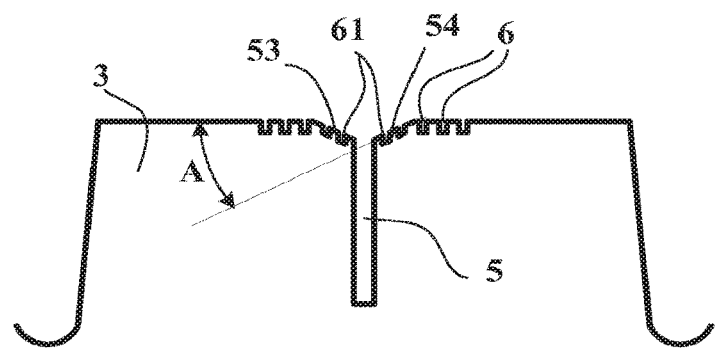
FIG. 7 shows an alternative form whereby the edge corners of the cut are extended towards the cut by a part forming a chamfer, this chamfer also being provided with cavities.

FIG. 7 shows an alternative form in which the edge corners of the cut 5 are extended towards the cut by chamfers 53, 54, these chamfers also being provided with cavities 61 of small depth. Each chamfer forms a flat part inclined by an angle equal to 45 degrees to a perpendicular to the tread surface (and in this instance to the direction of the cut). Each chamfer extends over a distance equal to 2 mm measured perpendicular to the tread surface.

According to this alternative form and thanks to the presence of a chamfer on each wall of the cut, the edge corners formed by the said cut on the tread surface become closer to one another as the tread wears away. Thanks to the presence of small cavities (in this instance small grooves) both on the tread surface and on the chamfered part, it is possible to avoid any tearing out of material either on the tread surface or on the chamfer.

Figure 8:
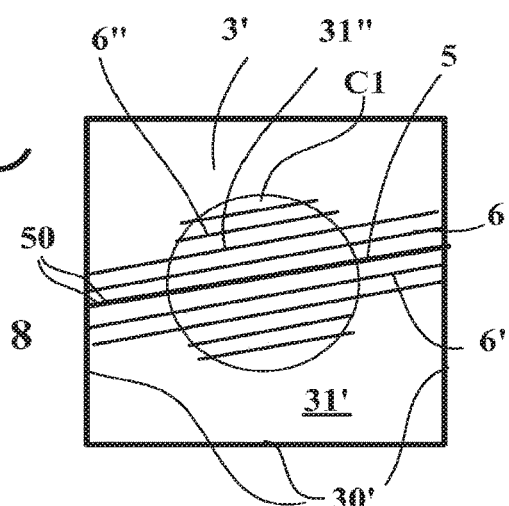
FIG. 8 shows a block of a tread according to the invention, this block comprising a sipe of transverse overall direction.

FIG. 8 shows a block 3' of a tread according to the invention, this block comprising a sipe 5 passing right through the said block to form two edge corners 50 on the contact face 31' of the block, this contact face itself being bounded by edge corners 30". In order locally to protect the block in the vicinity of the edge corners 50 formed by the sipe 5, a plurality of small cavities 6 (in the form of narrow grooves, i.e. grooves of a width less than 1 mm) are molded into the contact face 31' and in the vicinity of these two edge corners 50, the density of these cavities 6 being greater in the central part 31" of the block (i.e. more or less in the vicinity of the middle of the edge corners of the sipe 5). A greater cavities density means that the volume of cavities per unit area of the contact face is greater in the central part by comparison with the volume of cavities in the other parts and notably in the parts near the edges of the blocks. It is possible in this FIG. 8 to make out the presence of main grooves 6' of small width running parallel to the sipe 5 and over the entire length of this sipe 5. In a central part—delimited by a circle C1 centered on the intersection of the diagonals of the contact face—additional grooves 6" are formed; these additional grooves 6" are fully located within this circle C1 and are parallel to the main grooves 6'. In an alternative form that has not been depicted, these additional grooves 6" may be oriented in any other direction.

Figure 9:
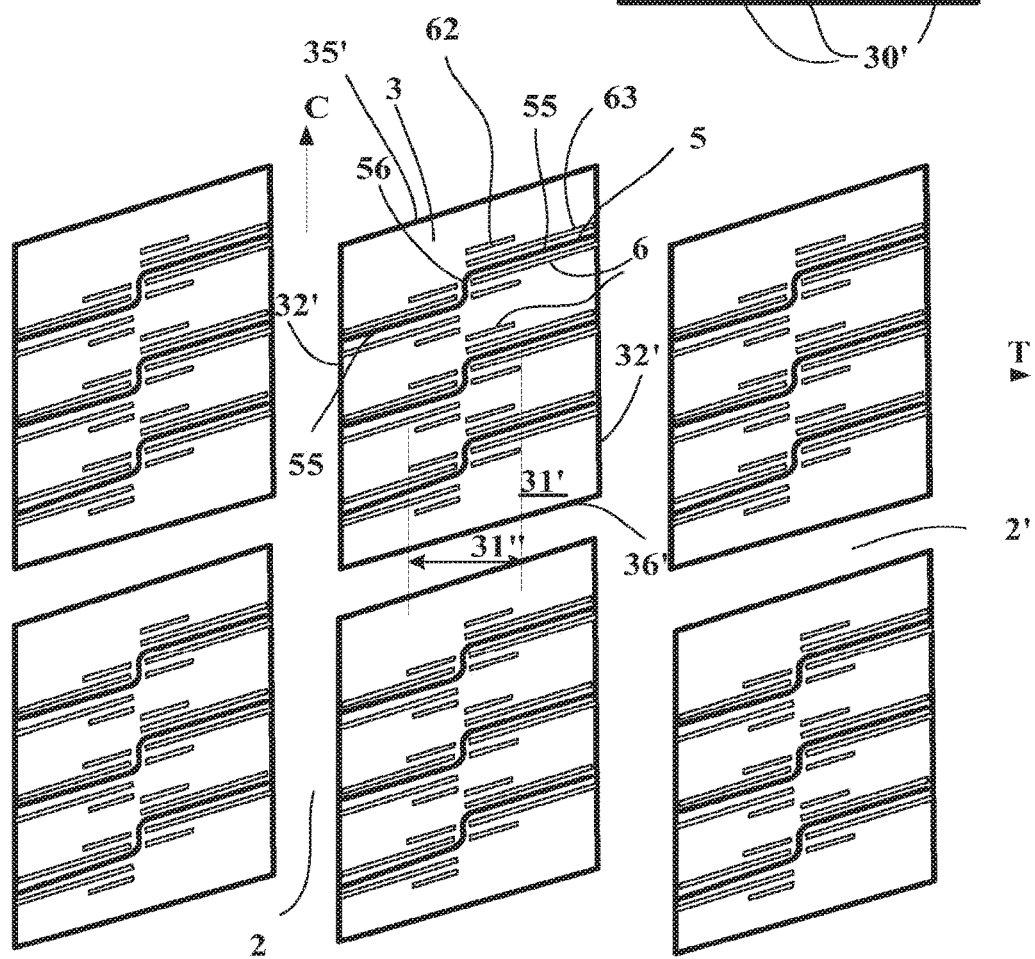
FIG. 9 shows a block of a tread according to the invention, this block comprising a sipe of transverse overall direction, this sipe comprising several parts with different orientations.

FIG. 9 shows a block 3 delimited by circumferential grooves 2 and transverse grooves 2'. The circumferential direction is indicated by the arrow C while the transverse direction is indicated by the arrow T in this figure. This block 3 comprises a contact face 31' delimited by front and rear edge corners 35', 36' and lateral edge corners 32'.

This block 3 is provided with a cut 5 of transverse overall direction. In the case described, this cut forms, on the contact face 31' of the block, three parts: two end parts 55 substantially parallel to the front 35' and rear 36' edge corners of the block and an intermediate part 56 joining together the end parts 55. These two end parts 55 each open onto a lateral edge of this block. The intermediate part is directed substantially parallel to the lateral edges of the block (and therefore substantially perpendicular to the front and rear edge corners of the block). In this alternative form of embodiment of the invention, the end parts 55 are protected by the placement of small grooves 63 in the vicinity of the edge corners of the said end parts. These small grooves 63 in this instance run parallel to the said end parts 55. Further, there is a greater density of small grooves in the vicinity of the connection between each end part and the connecting part in order to enhance the flexibility of the material more towards the central part 31" of the block 3. To do that, small grooves 62 parallel to the small grooves 63 but of a length shorter than that of these small grooves 63 are provided.

Figure 10:
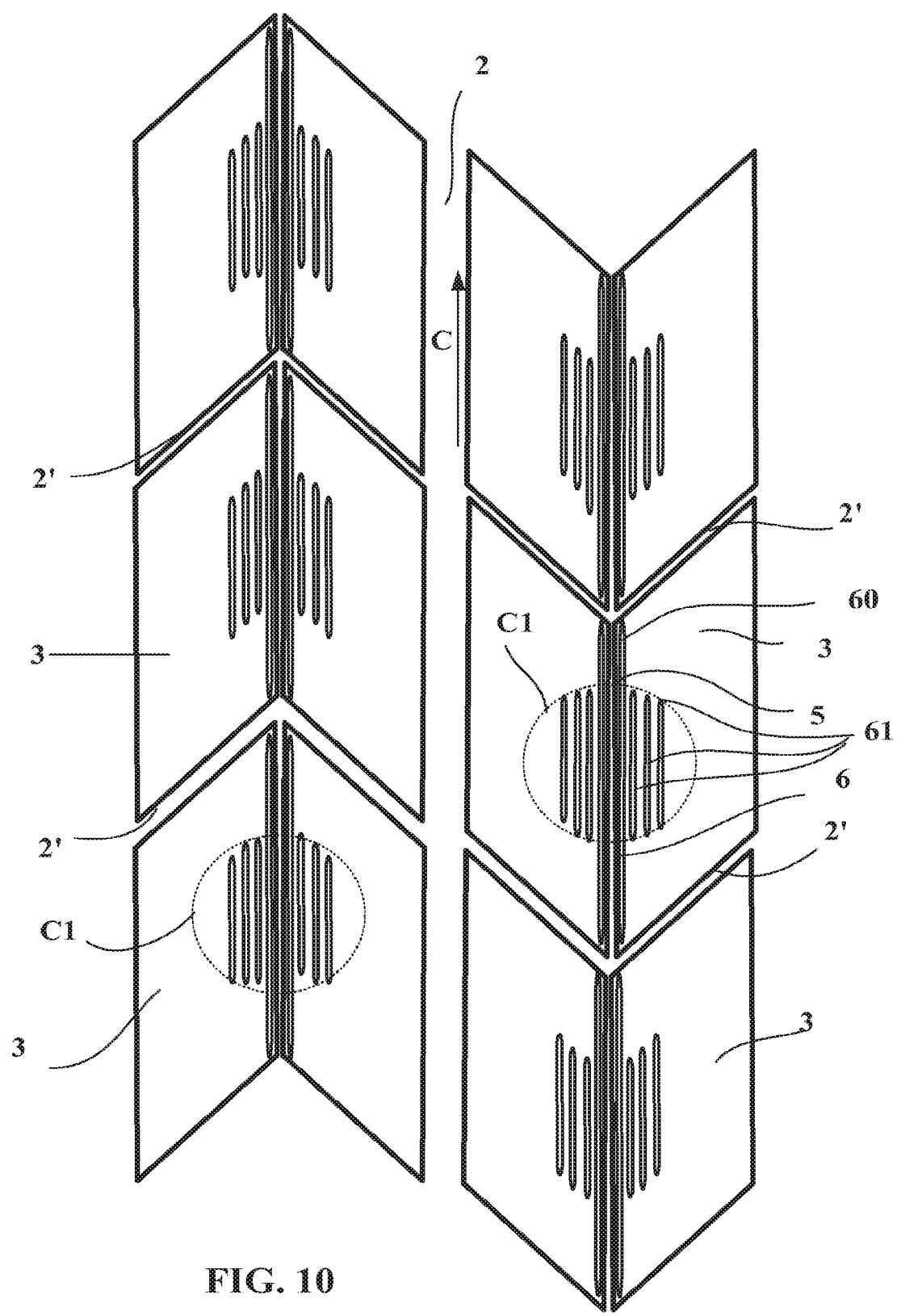
FIG. 10 shows two rows of blocks running in the circumferential direction of an alternative form of tread according to the invention.

FIG. 10 shows another alternative form of a tread according to the invention. This figure shows a set of two rows of raised elements running in the circumferential direction (this direction is indicated by the arrow C). These two rows are separated from one another by a circumferential groove 2. Each row comprises a plurality of raised elements 3 separated from one another in the circumferential direction by a cut 2' which in this instance is of a width less than the width of the circumferential groove 2. These cuts 2' here can be likened to sipes, i.e. the walls of the raised elements on each side of each sipe come into contact with one another during running.

Furthermore, each raised element 3 is provided with a sipe 5 running circumferentially, this sipe 5 opening at both ends into the cuts 2'.

In order to increase the mechanical resistance of the raised elements and, more particularly, the edge corners of the sipe 5, there is formed, in the vicinity of each of these edge corners, a main cavity 60 which, in this instance, extends over the entire circumferential length of the raised element. Further, a plurality of additional cavities 61 are formed, these being fully located in the central part C1 of the raised element in order to add to the additional flexibility created by the cavities 60 closest to the edge corners of the sipe 5. Located fully in the central part C1 of a raised element 3 here means that the additional cavities 61 are positioned inside an imaginary circle like the one shown very schematically in the figure, this circle lying a non-zero distance away from the edges of the raised element (this circle is centered on the middle of the sipe 5 considered in its circumferential length).

Another alternative form that has not been depicted here may advantageously supplement the alternative form shown in FIG. 10. According to this other alternative form it is possible to form, along the edge corners formed by the cuts 2' delimiting the raised elements 3, the same cavities as those formed along the edge corners of the sipe 6.

In the alternative form shown in FIG. 10, the cavities can be likened to sipes of a width equal to 0.6 mm and are molded in during the phase of molding the tread.

Of course, the invention is not restricted to the examples described and depicted and various modifications can be made thereto without departing from the scope defined by the claims. For example, when a tread comprises cavities that open onto the tread surface, these cavities having on the said surface a closed outline (i.e. forming a single edge corner of continuous outline), it is within the spirit of the invention to provide a region surrounding this edge corner with a plurality of cavities of shallow depth in order to enhance the surface flexibility in the vicinity of this edge corner and thus protect it against the tearing-out of material. Further, a person skilled in the art has the competence to combine the various alternative forms of embodiment described here according to the objective he is seeking to achieve.

The examples described in this text do not in any way limit the cuts to cuts perpendicular to the tread surface of the tread: it is of course possible to apply the invention to the case of cuts at an angle other than 90 degrees to the tread surface. Likewise, it is possible to enhance the flexibility more on one side of a cut than on the other side, either by forming cavities on just one side or by forming more cavities on one side than on the other.

What is claimed is:

1. A tire with a radial carcass reinforcement surmounted by a reinforcing belt, the reinforcing belt is surmounted radially outside by a tread of thickness E, this tread having a tread surface to come into contact with a roadway and being provided with grooves of depth P at most equal to the thickness E of the tread;

the grooves delimiting a plurality of raised elements, each raised element comprising a contact face forming a part of the tread surface and lateral faces intersecting the contact face to form edge corners;

at least two raised elements of the plurality of raised elements having at least one cut which is open onto the contact face to form edge corners;

the at least one cut extending into the respective raised element forming a bottom of the at least one cut having a total depth H at most equal to the thickness E of the tread;

the at least one cut is in a form of a sipe having a width D suitable for being able to close up at least in part during normal running conditions of the tire;

the sipe being between the contact face and a depth H1 at most equal to the total depth H;

the width D of the at least one cut is no greater at the bottom of the cut than at the contact face in at least one raised element of the at least two raised elements;

wherein a plurality of cavities are formed on the contact face on opposite sides of the at least one cut of the at least one raised element;

each cavity of said cavities is open to only one edge corner of the at least one cut of the at least one raised element and terminates within the at least one raised element;

each cavity of said cavities having a depth h that is at most equal to 15% of the depth H, wherein said cavities reduce the compression rigidity of the respective raised element in the vicinities of said edge corners of said at least one cut;

wherein said cavities are formed at a distance from one of said edge corners of said cut that is at most equal to five times the width D of said at least one cut; and wherein said cavities are grooves running parallel to one another and in such a way as to make an angle of at least 45° with the edge corners of the at least one cut.

2. The tire as set forth in claim 1 wherein, a density of cavities is greater in a middle part of the at least one cut.

3. The tire as set forth in claim 1 wherein at least one edge corner of said at least one cut has a chamfer that extends over the tread surface in the form of at least one cavity.

4. The tire as set forth in claim 1 wherein the raised elements are devoid of any cavity except adjacent said at least one cut.

5. The tire as set forth in claim 1 wherein the grooves of said cavities are perpendicular to a direction of the edge corners of the at least one cut.

* * * * *